(No Model.)
J. D. WILLET.
DRAFT EQUALIZER.
No. 390,736. Patented Oct. 9, 1888.
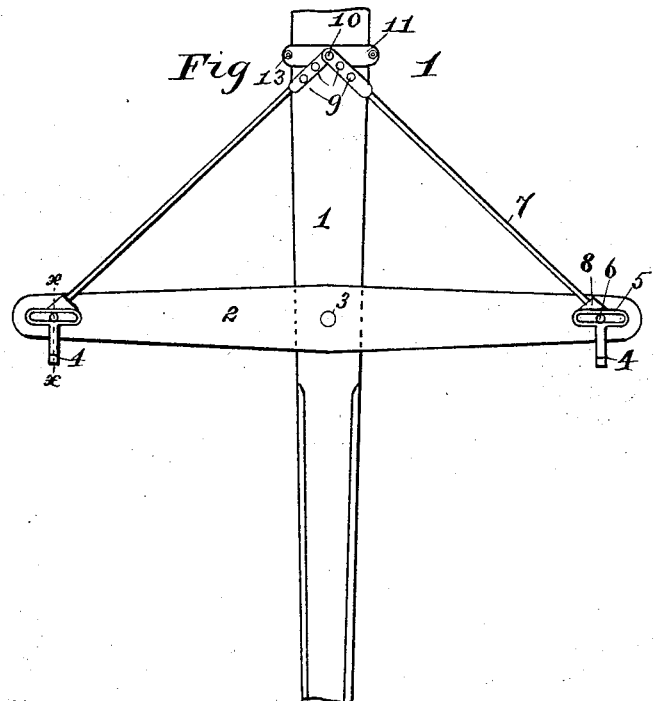
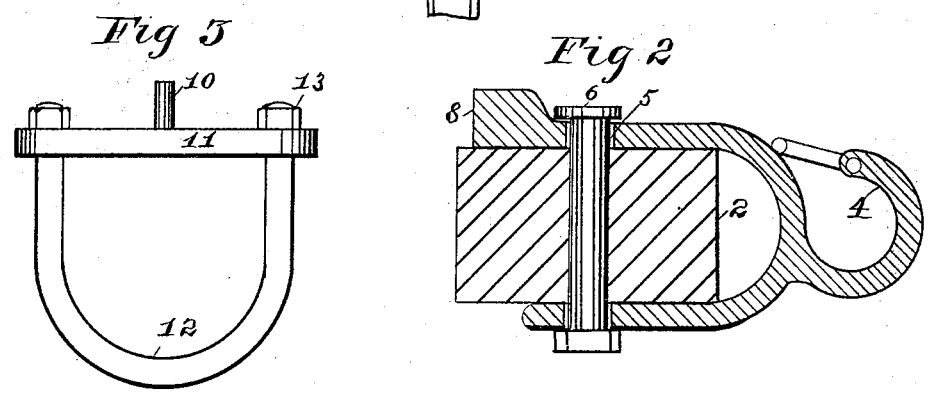
WITNESSES:
A. A. Gray.
INVENTOR.
Judson D. Willet.
BY R. W. McDermott.
his
ATTORNEY.

UNITED STATES PATENT OFFICE.

JUDSON D. WILLET, OF DENVER, COLORADO, ASSIGNOR OF TWO-THIRDS TO PERLEY G. CRISMAN AND JONATHAN B. KELLISON, OF SAME PLACE.

DRAFT-EQUALIZER.

SPECIFICATION forming part of Letters Patent No. 390,736, dated October 9, 1888.

Application filed June 19, 1888. Serial No. 277,586. (No model.)

*To all whom it may concern:*

Be it known that I, JUDSON D. WILLET, a citizen of the United States of America, residing at Denver, in the county of Arapahoe and State of Colorado, have invented certain new and useful Improvements in Draft-Equalizers, of which the following is a specification, reference being had therein to the accompanying drawings.

My invention relates to a draft-equalizer so constructed that the clevises or hooks to which the whiffletrees are attached may have a certain amount of movement longitudinally upon or along the doubletree, so that one may be brought nearer to the draft-pole and the other moved correspondingly away therefrom, to the end that the leverage of the more willing or ambitious or stronger-pulling animal may be decreased, while that of the less willing or ambitious or weaker-pulling animal is proportionately increased; and its objects are to provide a draft-equalizer of such kind or class of simple construction, adapted to be readily and easily applied to any pole-vehicle, new or old, durable and efficient, reliable in operation, adapted to automatically operate for the equalization of draft, and adapted, also, to be arranged and adjusted to give a certain fixed and definite equalization when desired as between the pole-animals whose average difference in effectiveness is known; to which ends it consists in the features and arrangements more particularly hereinafter described and claimed.

In the drawings is illustrated an embodiment of the invention, in which—

Figure 1 is a plan or top view thereof; Fig. 2, a section on line *x x*, Fig. 1; Fig. 3, a section on line *y y*, Fig. 1.

In these figures, the reference-numeral 1 indicates the tongue, and 2 the doubletree, pivoted thereon by the usual hammer or other bolt, 3.

4 4 are the clevises or hooks to which the whiffletrees are to be attached. These clevises are formed in the ordinary loop shape; but instead of ending in a solid base for rigid attachment to the doubletree the base at either end is formed into a loop, 5, extending transversely to the line of the hook 4. The clevises are secured to the doubletree by pins or bolts 6, passing through the body of the doubletree and through the loops 5, so that while they are secured together each clevis has an amount of longitudinal movement along and upon the doubletree equal to the length of the loop 5.

Upon the rear of one of the loops of each clevis is formed a small lug or abutment, 8, containing a socket, in which is secured one end of a stay or connecting rod, 7, there being used two such rods, one for each clevis. At their other ends each rod is formed with several apertures or holes, 9, by which the rods may be fastened to a pin or hook, 10, projecting from the tongue at the rear of the location of the doubletree. Such pin or hook may be secured to the tongue 1 by simple insertion of its shaft therein or by attachment to a base-plate secured by screws or bolts to the tongue. In order, though, to prevent weakening of the tongue by the aperturing thereof necessary for either such method, it is preferred to attach as shown in the drawings, wherein 12 is a U-clamp whose free ends are finished as tapped bolts. It is placed around the tongue with the bolt ends uppermost. The base-plate 11, carrying the pin or hook 10, has apertures coinciding with the tapped bolt ends, which are passed through such apertures, and the plate 11 and clamp 12 secured together and upon the tongue firmly by the clamping-nuts 13. By this arrangement it is readily seen that if in operation one animal pulls more than the other the stronger-pulling animal will pull its end of the doubletree forward, such forward movement, through the medium of the rod 7, causing the clevis on that side to be drawn in toward the pole, so that the leverage thereon of such stronger-pulling animal is lessened, while at the same time the clevis on the other and then rear end of the doubletree is thrown outwardly and the leverage of the animal on that side increased, thus causing both to exert the same power in moving the load. By arranging a series of holes or of loops, 9, in the rods 7 they may, when desired, be set or adjusted upon the pin 10 to hold the doubletree at a definite angle with one end advanced and one withdrawn, making the leverages of the two clevises proportioned relatively to the differences in pulling capacity of the animals of a team. By forming the clevises with the loops 5 the whole arrangement may be formed complete, separate from a wagon and be readily applied thereto without any cutting or fitting thereof other than the boring of the holes for the bolts 6 6.

Having thus described my invention, what I claim is—

1. The combination of a doubletree, clevises each having its base formed as an elongated loop or loops and slidingly secured to the doubletree, bolts or pins passing through the doubletree and such loops, and stay-rods connected at one end to the clevises and at the other to a pin upon the rear of the tongue, substantially as set forth.

2. The combination of a doubletree, the clevises 4, formed with elongated loop-bases 5, bolts 6, stay-rods 7, and pin 10, substantially as set forth.

3. The combination of a doubletree, the clevises 4, formed with elongated loop-bases 5, bolts 6, stay-rods 7, each having a series of apertures, 9, and pin 10 on a base-plate, 11, substantially as set forth.

In testimony whereof I affix my signature in presence of two witnesses.

JUDSON D. WILLET.

Witnesses:
Z. F. WILBER,
PERLEY G. CRISMAN.